United States Patent
Omata

(10) Patent No.: US 10,104,268 B2
(45) Date of Patent: Oct. 16, 2018

(54) IMAGE FORMING APPARATUS, METHOD FOR CONTROLLING SAME, AND STORAGE MEDIUM

(71) Applicant: CANON KABUSHIKI KAISHA, Tokyo (JP)

(72) Inventor: Jun Omata, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/949,537

(22) Filed: Jul. 24, 2013

(65) Prior Publication Data
US 2014/0029021 A1    Jan. 30, 2014

(30) Foreign Application Priority Data

Jul. 26, 2012 (JP) ................. 2012-165943

(51) Int. Cl.
| | |
|---|---|
| H04N 1/40 | (2006.01) |
| H04N 1/393 | (2006.01) |
| G03G 15/00 | (2006.01) |
| H04N 1/23 | (2006.01) |
| G03G 15/23 | (2006.01) |

(52) U.S. Cl.
CPC .......... *H04N 1/393* (2013.01); *G03G 15/231* (2013.01); *G03G 15/50* (2013.01); *H04N 1/2353* (2013.01); *G03G 15/234* (2013.01)

(58) Field of Classification Search
USPC ................ 358/1.1, 1.15, 1.13, 471, 468, 1.2
See application file for complete search history.

(56) References Cited

U.S. PATENT DOCUMENTS

| | | | | |
|---|---|---|---|---|
| 5,010,371 | A * | 4/1991 | Matsuo ............. | G03G 15/5095 271/259 |
| 5,144,372 | A * | 9/1992 | Miyamoto ............ | G03G 15/01 358/453 |
| 6,125,242 | A * | 9/2000 | Yamada .................... | B41J 3/60 399/23 |
| 6,580,521 | B1 * | 6/2003 | Nishikawa ............ | G06K 15/02 358/1.12 |
| 6,873,427 | B1 * | 3/2005 | Matsuda et al. ............. | 358/1.15 |
| 8,271,904 | B2 * | 9/2012 | Konuma ....................... | 715/840 |
| 8,517,617 | B2 * | 8/2013 | Hashimoto .................... | 400/582 |
| 8,596,523 | B2 * | 12/2013 | Murray et al. ................ | 235/375 |
| 8,649,067 | B2 * | 2/2014 | Kanai ............................ | 358/403 |
| 2002/0052897 | A1 * | 5/2002 | Nishikawa ............ | G06F 3/1204 715/201 |
| 2004/0125394 | A1 * | 7/2004 | Terao et al. ................... | 358/1.13 |
| 2004/0239959 | A1 | 12/2004 | Yada | |
| 2005/0105135 | A1 * | 5/2005 | Takahashi ............ | G06F 3/0486 358/1.18 |
| 2005/0123332 | A1 * | 6/2005 | Mochizuki et al. .......... | 399/410 |

(Continued)

FOREIGN PATENT DOCUMENTS

| | | |
|---|---|---|
| CN | 102131032 A | 7/2011 |
| JP | H01-244475 A | 9/1989 |
| JP | 2009-303184 A | 12/2009 |

*Primary Examiner* — Jerome Grant, II
(74) *Attorney, Agent, or Firm* — Canon U.S.A., Inc. IP Division

(57) ABSTRACT

While a cost is suppressed by providing no sensor configured to detect a size of a document, and a user's operation load for adjusting the position of the document is reduced, printing positions of an image on the surface of the document and an image on the back thereof are placed on the same location.

20 Claims, 14 Drawing Sheets

(56) References Cited

U.S. PATENT DOCUMENTS

| | | | | |
|---|---|---|---|---|
| 2007/0177225 A1* | 8/2007 | Morishita | ......... | H04N 1/32128 |
| | | | | 358/474 |
| 2007/0285697 A1* | 12/2007 | Ebina | ..................... | B41L 13/06 |
| | | | | 358/1.12 |
| 2008/0024845 A1* | 1/2008 | Makino | .................. | H04N 1/387 |
| | | | | 358/538 |
| 2009/0021772 A1* | 1/2009 | Salgado | ............... | G06F 3/1205 |
| | | | | 358/1.15 |
| 2009/0027745 A1* | 1/2009 | Kweon | .................. | H04N 1/203 |
| | | | | 358/498 |
| 2009/0310162 A1 | 12/2009 | Okayama | | |
| 2010/0172663 A1* | 7/2010 | Nakai | ............................ | 399/45 |
| 2010/0271646 A1* | 10/2010 | Morimoto | .......... | G03G 15/5025 |
| | | | | 358/1.9 |
| 2010/0271662 A1* | 10/2010 | Terao et al. | .................. | 358/1.15 |
| 2010/0309528 A1* | 12/2010 | Nacman | ................... | H04N 1/40 |
| | | | | 358/444 |
| 2010/0328729 A1* | 12/2010 | Hirao | .................. | H04N 1/0057 |
| | | | | 358/449 |
| 2011/0097129 A1 | 4/2011 | Hashimoto | | |
| 2011/0228347 A1* | 9/2011 | Kohara | .................. | G03G 15/36 |
| | | | | 358/446 |
| 2013/0141738 A1* | 6/2013 | Shibata | .................. | G06K 15/02 |
| | | | | 358/1.2 |
| 2014/0085645 A1* | 3/2014 | Okazaki | ............ | G06K 15/1868 |
| | | | | 358/1.2 |
| 2014/0153060 A1* | 6/2014 | Takahashi | .......... | H04N 1/00411 |
| | | | | 358/468 |

\* cited by examiner

IMAGE FORMING APPARATUS, METHOD FOR CONTROLLING SAME, AND STORAGE MEDIUM

BACKGROUND

Technical Field

Aspects of the present invention relate to an image forming apparatus, a method for controlling the same, and a storage medium.

Description of the Related Art

Conventionally, an image forming apparatus exists, which has no sensor for detecting the size of a document placed in a platen to suppress a cost. When a copy is made using such an image forming apparatus, the image forming apparatus sets the size of a printing sheet as the size of the document, and reads the document (see Japanese Patent Application Laid-Open No. 2009-303184). For example, as illustrated in FIG. 14A, a user instructs reading of the surface of a document 1304 with a central axis of the document 1304 adjusted to a center 1302 of a platen. Alternatively, the user instructs reading of the back of a document 1308 with a central axis of the document 1308 adjusted to the center 1302 of the platen. The image forming apparatus receiving the instruction reads an image of a region 1301 corresponding to the size of the printing sheet, and forms the read image on each of the back and surface of the sheet. As a result, as illustrated in the printing result of FIG. 14A, the formation positions of an image 1309 on the surface of the printing sheet and an image 1310 on the back thereof are aligned with the center of a sheet 1311.

Further, when the image forming apparatus has no sensor for detecting the size of the document placed in the platen, an image forming apparatus can be configured to read the document by making the document abut against the corner of the platen. Because the image forming apparatus can position the document by making the corner of the document butt against a butting position 1402 provided at the corner of the platen as illustrated in FIG. 14B, it is unnecessary for the user to adjust the central axis of the document with attention to the center of the platen.

However, when the document is smaller than the printing sheet, unless an image is read focusing on a region of the document size if the images are printed on the back and surface of the printing sheet, the printing positions of the images on the back and the surface do not match each other, which degrades appearance of the printed images. The printing result illustrated in FIG. 14B illustrates images on the surface and on the back when viewed through from the surface. The printing positions of the image on the surface and the image on the back are different from each other in the case of the printing result as illustrated, which degrades the image appearance. When a blank portion on the surface is cut off, the image on the back is cut off, which hampers convenience.

Consequently, there is a conventional method which receives information indicating the size of a document from a user before reading the document, reads the document in a region equivalent to the indicated size, and prints the document on a printing sheet. When this method is used, a blank portion does not appear in the image of the read document. Therefore, because the images of the read documents can be matched on the back and surface of the printing sheet, the position of the images on the surface and on the back do not become misaligned when the image of the document butting against the corner of the platen is formed on each of the back and surface of the printing sheet.

However, in the conventional method, the user must set the size of the document before the document is read under any circumstance.

For example, when one-sided printing is executed, it is unnecessary to care about misalignment of the images on the surface of the sheet and on the back thereof. Because the conventional method forces the user to set the size of the document even in such a case, additional work is required for the user.

SUMMARY

According to an aspect of the present invention, an image forming apparatus includes: a receiving unit configured to receive information indicating a size of a document placed in a platen, from a user; a setting unit configured to set whether to perform one-sided printing or two-sided printing; a reading unit configured to read an image of the document; a control unit configured to perform control to read the image of the document according to the size of the document indicated by the information received by the receiving unit when the two-sided printing is set by the setting unit, and configured to perform control to read the image of the document according to a size of a sheet used for printing even if the receiving unit does not receive the information indicating the size of the document when the one-sided printing is set by the setting unit; and a printing unit configured to print the image of the document read by the reading unit on the sheet.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
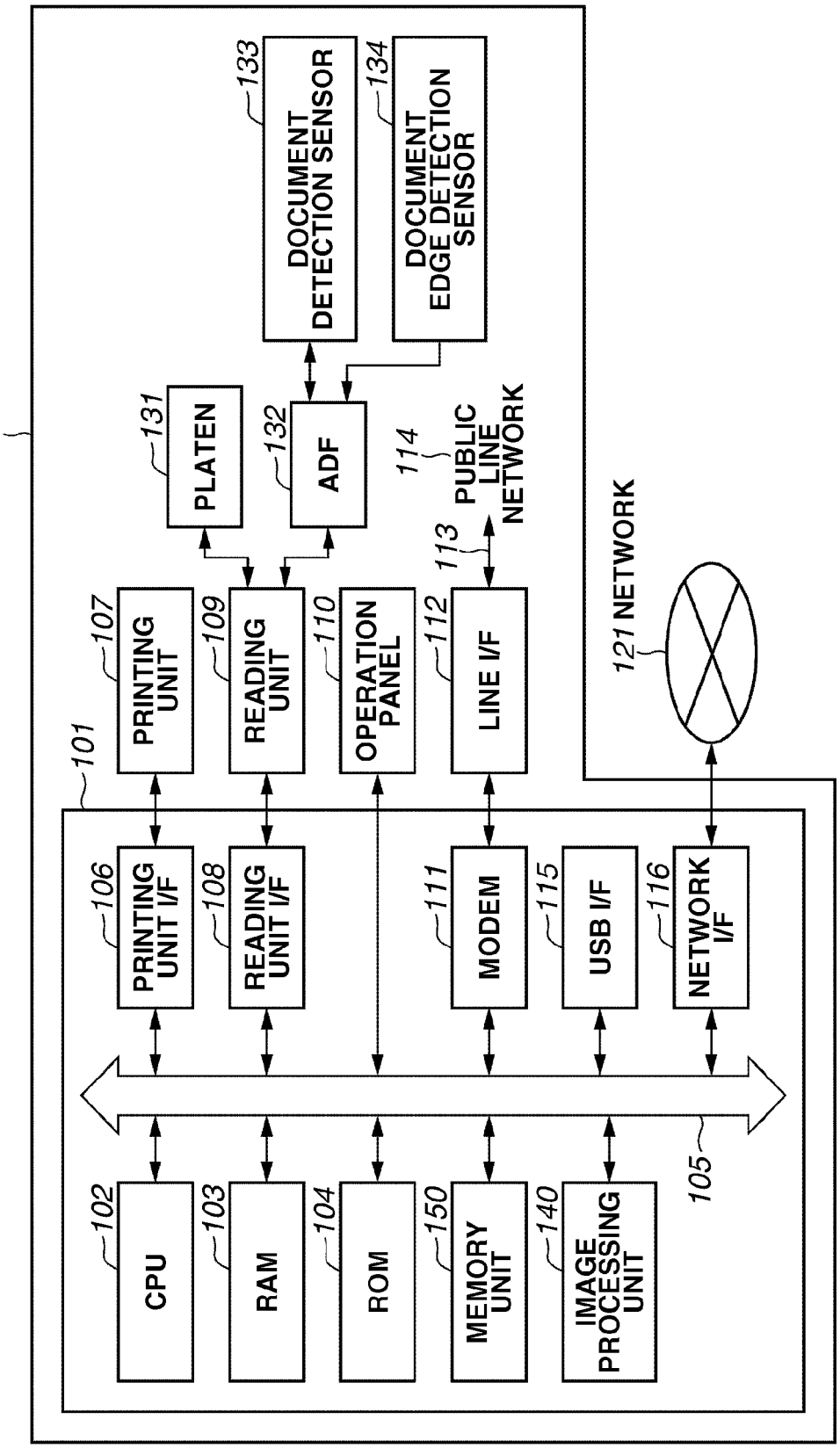
FIG. 1 is a block diagram illustrating a configuration of an image forming apparatus according to an exemplary embodiment of the present invention.

FIG. 1 illustrates an MFP 100 which is an example of an image forming apparatus according to the present exemplary embodiment. The MFP is an abbreviation of the Multi Function Peripheral.

The MFP 100 has a controller unit 101, a printing unit 107, a reading unit 109, an operation panel 110, an line I/F 112, a platen 131, an auto document feeder (ADF) 132, a document detection sensor 133, and a document edge detection sensor 134.

The controller unit 101 has a processing unit (CPU) 102, a random access memory (RAM) 103, a read only memory (ROM) 104, a printing unit I/F 106, a reading unit I/F 108, a modulator-demodulator (MODEM) 111, a universal serial bus (USB) I/F 115, a network I/F 118, an image processing unit 140, and a memory unit 150. These units are connected to a system bus 105.

The CPU 102 executes various programs to integrally control the MFP 100.

The RAM 103 functions as a work memory for the CPU 102.

The ROM 104 stores the various programs read out by the CPU 102.

The printing unit I/F 106 is an interface configured to output an image signal to the printing unit 107. The printing unit 107 has a paper feed cassette, an image forming unit, and a discharge unit. The image forming unit prints an image on a sheet fed from the paper feed cassette, and discharges the sheet to the discharge unit.

The reading unit I/F 108 is an interface configured to input a read image signal from the reading unit 109. The reading unit 109 reads a document placed in the platen 131, and inputs image data representing an image of the read document into the CPU 102 via the reading unit I/F 108. The reading unit 109 reads the document conveyed by the ADF (auto document feeder) 132, and inputs the image data representing the image of the read document into the CPU 102 via the reading unit I/F 108. The CPU 102 stores the image data input from the reading unit I/F 109 in the memory unit 150, and causes the image processing unit 140 to process the image data. The CPU 102 outputs the processed image data to the printing unit I/F 106 as printing image data. The ADF 132 has the document detection sensor 133 for detecting whether the document is placed in the ADF, and the document edge detection sensor 134 for detecting the edge of the conveyed document. The sensors 134 and 135 send the detected signals to the CPU 102.

The operation panel 110 has a liquid crystal display unit with a touch panel, and displays an operation screen and a message. The operation panel 110 receives an instruction from a user via the touch panel or a hard key.

The MODEM 111 is connected to a public line network 114 via the line I/F 112 to perform communication with other image forming apparatuses, facsimile apparatuses, and telephones (which are not illustrated). The line I/F 112 and the public line network 114 are generally connected with a telephone line 113.

The USB I/F 115 is an interface configured to connect to a USB memory. The USB I/F 115 is used also to connect the image forming apparatus to an external PC.

A network I/F 116 controls communication with a network 121.

The image processing unit 140 performs variable-magnification processing, rotation processing, and erasure processing on the image data.

The memory unit 150 is a storage unit configured to store image data and programs. The memory unit 150 includes an HDD (hard disk drive) or an SSD (solid state drive).

Figure 2:
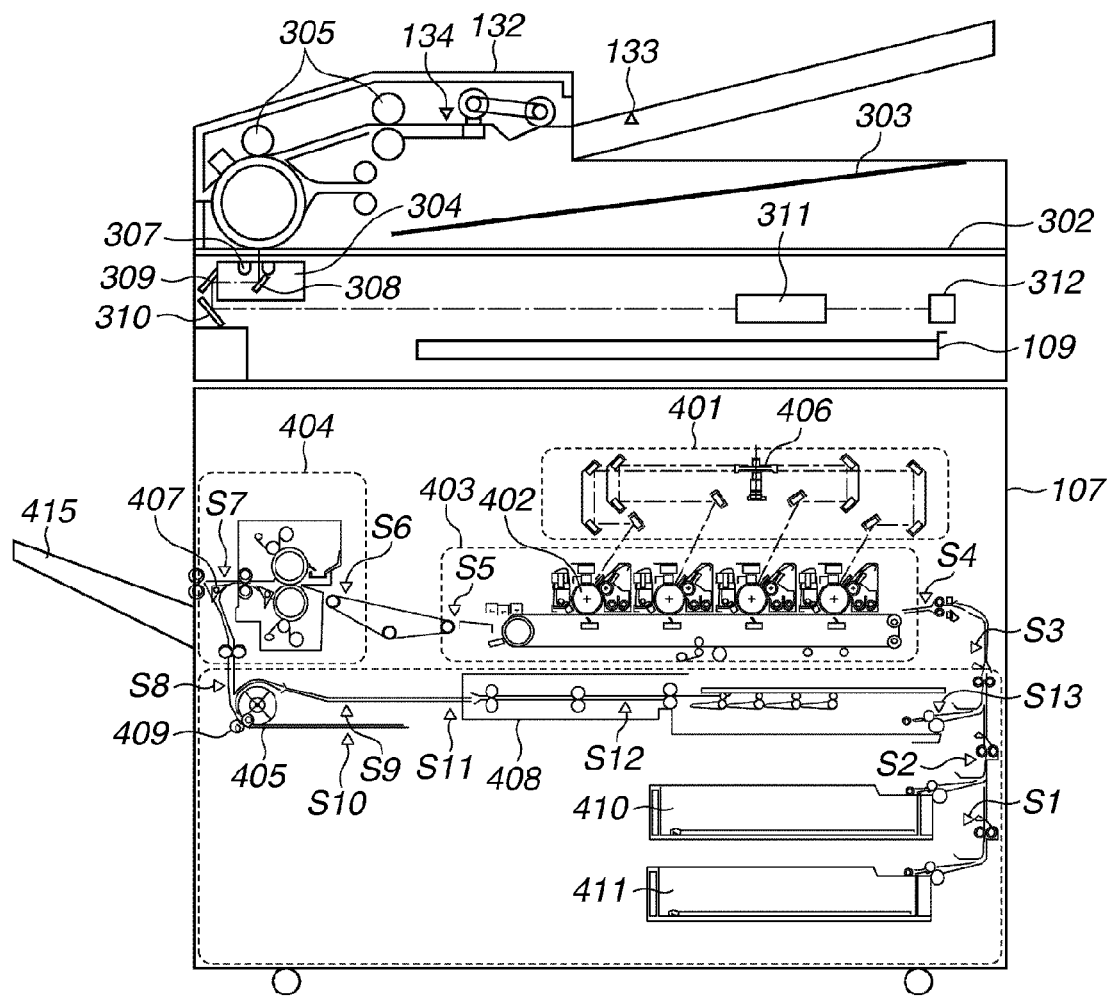
FIG. 2 is a cross-sectional view illustrating a configuration of an image forming apparatus according to an exemplary embodiment of the present invention.

Next, a configuration of the MFP 100 will be described with reference to a cross-sectional view of the MFP 100 of FIG. 2.

The MFP 100 has the ADF 132. The documents stacked in the ADF 132 are conveyed sequentially onto a platen glass 302 one by one from the head in their stacked order. Then, the documents are scanned on the platen glass 302, and discharged onto a discharge tray 303.

A conveyance roller 305 configured to be driven by a stepping motor and the document edge detection sensor 134 for detecting the leading and trailing edges of the document are provided on a document conveyance path for guiding the documents.

The documents stacked in the ADF 132 are conveyed at a constant conveyance speed by the conveyance roller 305 driven by the stepping motor. The conveyance speed is determined at the time of shipment of the MFP 100 from the factory, and previously stored in the HDD 104.

Herein, a method for obtaining information indicating the size of the document placed in the ADF 132 will be described. First, the user adjusts a document width guide included in the ADF 301 to a width of the document. The document width guide includes a sensor configured to send a length in a main-scanning direction of the document to the CPU 102. The CPU 102 can receive a signal from the document width guide, and acquire the length information in the main-scanning direction of the document. The CPU 102 stores the length information in the main-scanning direction of the acquired document, in the RAM 103.

Next, a method for acquiring a length in a sub-scanning direction of the document will be described. The CPU 102 stores a time t1 when the leading edge of the document passes through a document detection sensor 306 in the RAM 103, and stores a time t2 when the trailing edge of the document passes through the document detection sensor 306 in the RAM 103. The length information in the sub-scanning direction (conveyance direction) of the document can be acquired by calculating a difference obtained by subtracting the time t1 from the time t2, and obtaining a product of the calculated difference and the conveyance speed. The CPU 102 stores the length information in the sub-scanning direction of the acquired document, in the RAM 103.

The CPU 102 identifies a size of a sheet having the length in the main-scanning direction and the length in the sub-scanning direction of the document stored in the RAM 103. The size of the identified sheet is stored in the HDD 104. Then, the CPU 102 reads the image of the document conveyed by the ADF 132 in a reading region of the size of the corresponding sheet.

When the documents are conveyed at a constant speed through a document skimming-through reading position, an optical unit 307 moves to the document skimming-through reading position, and irradiates the documents conveyed at a constant speed with a light source. Reflected light from the document is guided via a plurality of mirrors 308, 309, and 310, and a lens 311 to a charged-couple device image sensor (hereinafter, referred to as "CCD") 312. Consequently, an image of the scanned document is read by the CCD 312. Image data in each color (R, G, and B) is generated by continually reading the image with the CCD 312. The image data is then transferred to a memory unit 124 to be stored or printed.

A printing unit (corresponding to the printing unit 107 of FIG. 1) has four developing units for forming an image with cyan (C), magenta (M), yellow (Y), and black (K) toners to form color and monochrome images.

The printing unit 107 has a laser exposure unit 401, a rotating polygonal mirror (polygon mirror) 406, a photosensitive drum 402, an image forming unit 403, a fixing unit 404, a flapper 405, and a reversing path 408. Further, the printing unit 107 has a paper feed cassette 410 and a paper feed cassette 411.

The laser exposure unit 401 emits a light beam such as laser light modulated based on the image data, onto the rotating polygonal mirror (polygon mirror) 406 rotating at a constant angular velocity, to irradiate the photosensitive drum 402 with the light beam which is reflected scanning light.

The image forming unit 403 includes four developing units (developing stations), each of which executes a series of electrophotographic processes. More specifically, each developing unit drives and rotates a photosensitive drum 402, charges the photosensitive drum using a charger, and develops and forms a latent image on the photosensitive drum 402 by the laser exposure unit 401 with a toner. Then, the developing unit transfers the toner image onto a sheet, and collects the small amount of toner which has not been transferred and remains on the photosensitive drum 402. The four developing units are arranged in order of cyan (C), magenta (M), yellow (Y), and black (K). After a predetermined period has elapsed from the start of image formation at the cyan developing unit, image forming is successively executed by the magenta, yellow, and black developing units. Based on this timing control, a color image free from color misregistration is transferred onto the sheet.

The fixing unit 404 is configured from a combination of rollers and belts. The fixing unit 404 incorporates a heat source such as a halogen heater, and fuses and fixes by heat and pressure the toner on the sheet on which the toner image has been transferred by the image forming unit 403.

The paper feed cassettes 410 and 411 accommodate the sheets. In the present exemplary embodiment, the sizes of the sheet which can be accommodated in the paper feed cassette 410 and the paper feed cassette 411 are A5 size, A4 size, and B5 size. The A5 size has an area of 148 mm×210 mm; the A4 size has an area of 210 mm×297 mm; and the B5 size has an area of 182 mm×257 mm.

The MFP 100 feeds a sheet from either of the paper feed cassettes 410 and 411, and transfers the image formed by the image forming unit 403 onto the fed sheet. Then, the MFP 100 fixes the transferred image on the sheet with the fixing unit 404. Next, when the sheet is discharged with the face on which the image is formed, looking downwards (when performing face down discharge), the MFP 100 guides the sheet with the flapper 407 to the reversing path 405, and discharges the reversed sheet onto the discharge tray 415. On the other hand, when the sheet is discharged with the face looking upwards (when performing face up discharge), the MFP 100 discharges the sheet onto the discharge tray 415 without guiding it with the flapper 407 to the reversing path 405.

When printing an image on both sides of the sheet, the MFP 100 guides the sheet to the reversing path 405 with the flapper 407, pinches the trailing edge of the sheet with the roller 409, and then guides the sheet to the two-sided conveyance path 408. The sheet which has been guided to the two-side conveyance path 408 is again conveyed to the image forming unit 403, and an image is printed on the back of the sheet by the image forming unit 403. Then, the sheet which has an image formed on its back is discharged onto the discharge tray 415.

Sensors S1 to S13 are provided to detect the state of the street on the conveyance path. The CPU 102 determines whether the sheet is jammed on the conveyance path based on signals from the sensors S1 to 13.

Thus, the MFP 100 executes print processing for printing an image on a sheet.

Figure 3:
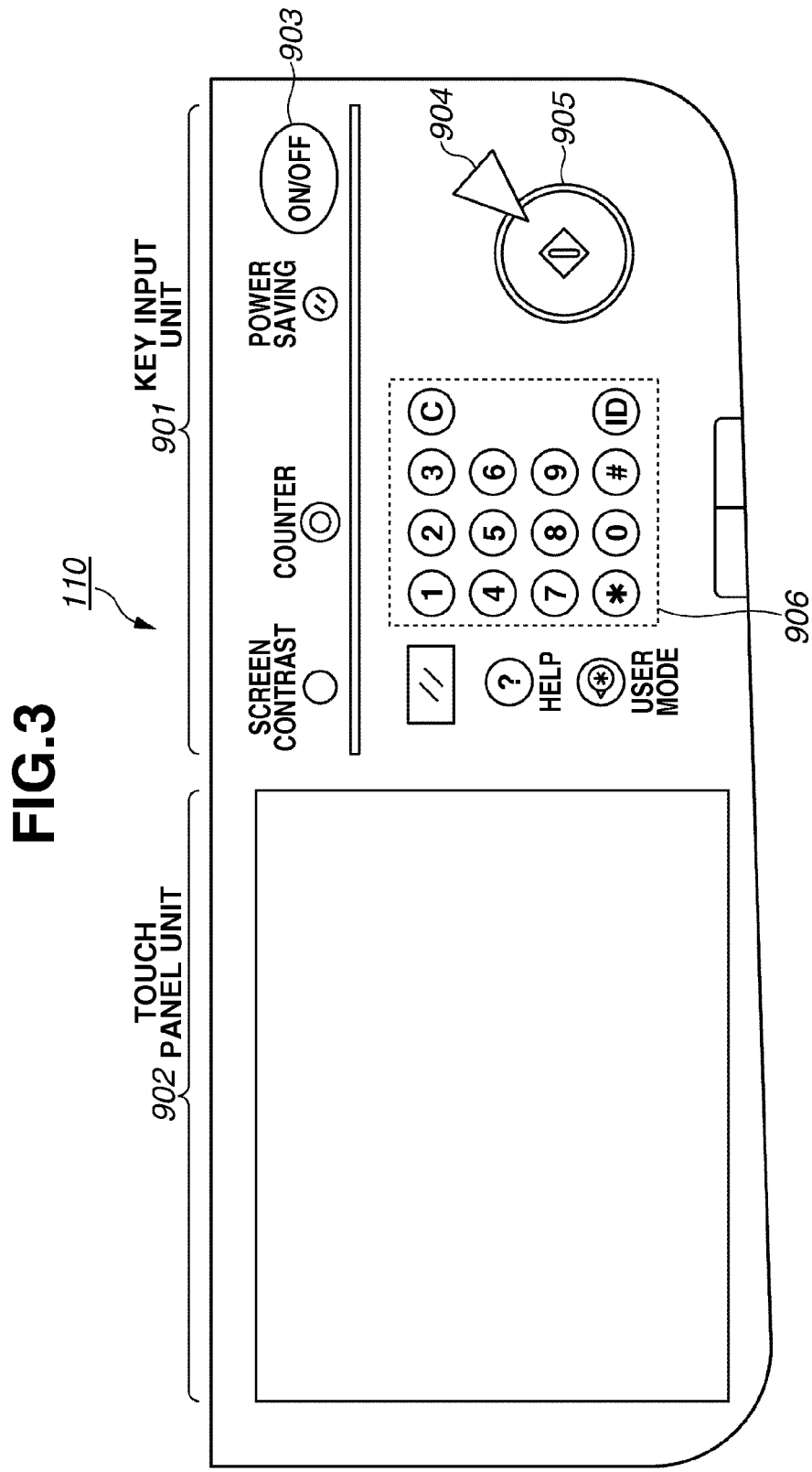
FIG. 3 illustrates an operation unit according to an exemplary embodiment of the present invention.

Next, the operation panel 110 included in the MFP 100 illustrated in FIG. 2 will be described with reference to FIG. 3.

The operation panel 110 includes a key input unit 901 configured to receive a user operation through hard keys and a touch panel unit 902 configured to display soft keys (display keys) through which the user operation is received.

First, the key input unit 901 will be described. As illustrated in FIG. 3, the key input unit 901 includes an operating unit power switch 903. If the user presses the operating unit power switch 903 when the MFP 101 is in a standby mode (in a normal operation state), the CPU 102 switches the MFP 100 from the standby mode to a sleep mode (a state of saving a power consumption). On the other hand, if the user presses the operating unit power switch 903 when the MFP 100 is in the sleep mode, the CPU 102 switches the MFP 100 from the sleep mode to the standby mode.

A start key 905 receives from the user an instruction for causing the MFP 100 to execute a copying operation and a transmission operation of data.

A stop key 904 receives from the user an instruction for pausing the copying operation and the transmission operation of data.

A numeric keypad 906 causes the user to execute the various kinds of numerical settings.

Next, the touch panel unit 902 will be described. The touch panel unit 902 includes a liquid crystal display (LCD) unit and a touch panel sheet including a transparent electrode attached thereon. The touch panel unit 902 has a function to receive various kinds of settings from the user and a function to provide information to the user.

Figure 4:
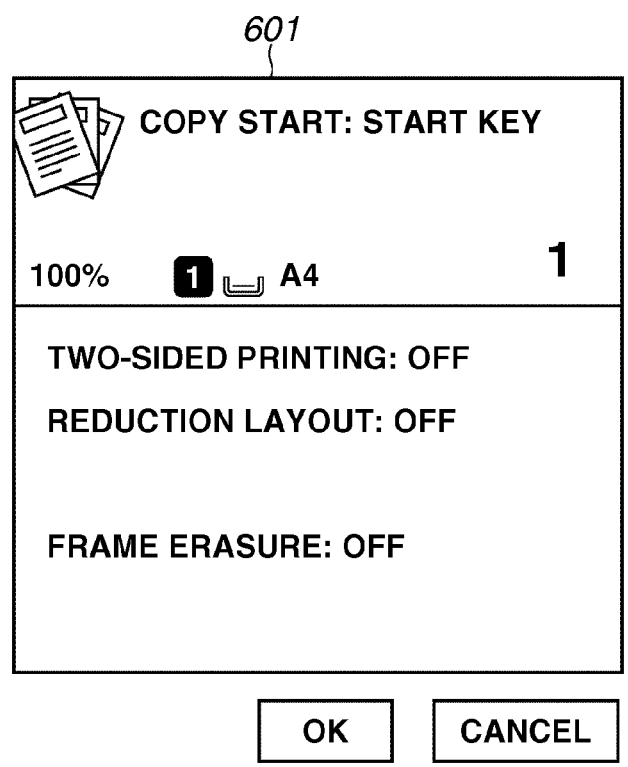
FIG. 4 illustrates an operation screen according to an exemplary embodiment of the present invention.

FIG. 4 illustrates an operation screen 601 displayed on the touch panel unit 902 when the MFP 100 is started. The user operates the operation screen 601 to perform settings for copying such as a printing magnification, settings for a paper feed cassette configured to feed a printing sheet, and number of copies.

The printing magnification is set to 100% (same magnification) as an initial value. The user touches a display of 100%, and then inputs any number of printing magnifications of 50% to 200% with the numeric keypad 906 to set the printing magnification. When the copying is started, the CPU 102 magnifies the image of the read document by the set printing magnification factor, and prints it on the sheet.

The paper feed cassette 1 is set to be a paper feed cassette for feeding the printing sheet as an initial value. The user touches the display of the paper feed cassette, and then selects a paper feed cassette to be used as the paper feed cassette for feeding the printing sheet from displayed options (the paper feed cassette 1 or the paper feed cassette 2). The paper feed cassette 1 corresponds to the paper feed cassette 410 of FIG. 2, and the paper feed cassette 2 corresponds to the paper feed cassette 411 of FIG. 2. When the copying is started, the CPU 102 performs control to feed the sheet from the set paper feed cassette.

The number of copies is set to "1" as an initial value. The user touches the display of "1", and then operates the numeric keypad 906, to set the number of copies. When the copying is started, the images of a series of documents read by the reading unit 109 are printed on the sheet according to the set number of copies.

The MFP 100 has a plurality of functions such as a two-sided printing function, a reduction layout function, and a frame erasure function, as application functions.

The user can operate the operation screen 601 to set these functions.

The two-sided printing function is a function to print the image of the document read by the reading unit 109 on both sides of the sheet. One-sided printing is set as an initial value with respect to the two-sided printing function. When the user touches "two-sided printing: OFF", the CPU 102 causes the touch panel unit 902 to display a screen 607 illustrated in FIG. 5.

Figure 5:
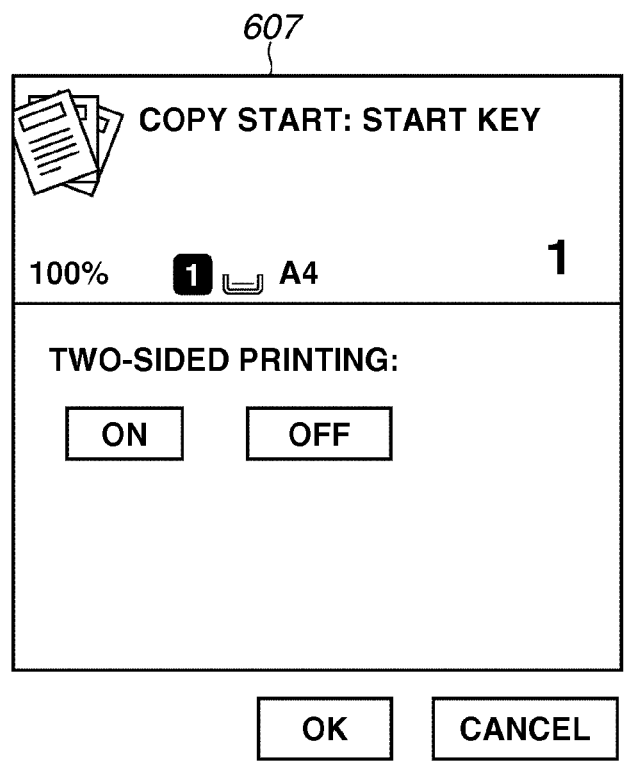
FIG. 5 illustrates an operation screen according to an exemplary embodiment of the present invention.

An "ON" key and an "OFF" key are displayed on the screen 607 illustrated in FIG. 5. When the user presses the "ON" key, the CPU 102 stores information representing that two-sided printing is set, in the RAM 103. On the other hand, when the user presses the "OFF" key, the CPU 102 stores information representing that one-sided printing is set, in the RAM 103. When the copying is started in a state where the two-sided printing is set, the CPU 102 performs control to print the image on both sides of the sheet. On the other hand, when the copying is started in a state where the one-sided printing is set, the CPU 102 performs control to print the image on the one-sided of the sheet.

The reduction layout function is a function to reduce images of documents of a plurality of pages read by the reading unit 109 and print the reduced images side by side on one sheet. OFF is set as an initial value in the reduction layout function. That is, an image of a document of one page is set to be printed on one sheet. When the user touches "reduction layout: OFF", the CPU 102 causes the touch panel unit 902 to displays a screen 604 illustrated in FIG. 6.

Figure 6:
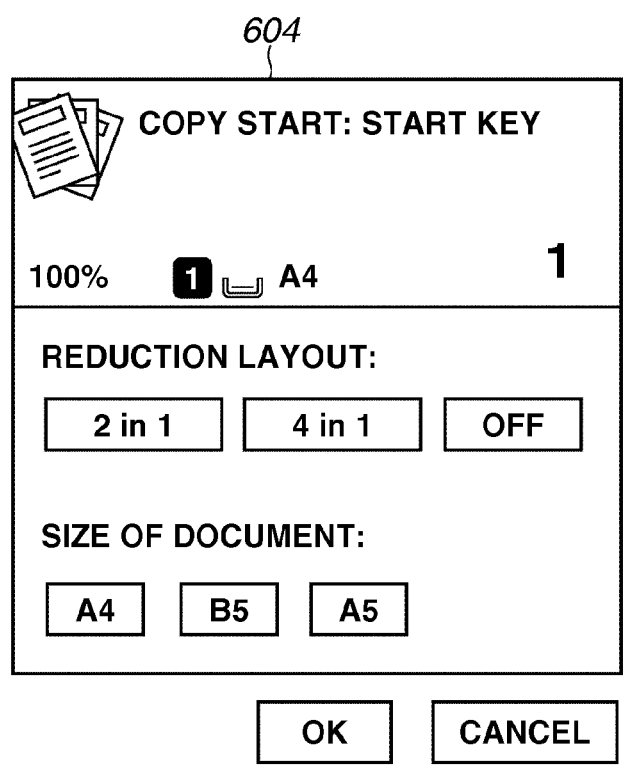
FIG. 6 illustrates an operation screen according to an exemplary embodiment of the present invention.

A "2 in1" key, a "4in1" key, and an "OFF" key are displayed on the screen 604 illustrated in FIG. 6. When the user presses the "2in1" key, the CPU 102 reduces the images of the plurality of pages of the read documents to 50%, and stores information representing that images of two pages are set to be printed side by side per one sheet, in the RAM 103. When the user presses the "4in1" key, the CPU 102 reduces the images of the plurality of pages of the read documents to 25%, and stores information representing that images of four pages are set to be printed side by side per one sheet, in the RAM 103. When the user presses the "OFF" key, the CPU 102 stores information representing that the images of the read documents are set to be printed on one sheet without reducing the images, in the RAM 103. When the copying is started, the CPU 102 performs control to print the images of the plurality of pages of the documents read by the reading unit 109 on the sheet according to setting of reduction layout.

The user needs to set the size of the document to use the reduction layout function. This is because if a region larger than the size of the document is read when the images of the plurality of pages are printed side by side on one sheet, a blank portion appears in the image of each page, which degrades an appearance.

Consequently, an "A4" key, a "B5" key, and an "A5" key are displayed on the screen 604 illustrated in FIG. 6. The CPU 102 stores the size pressed by the user as the size of the document, in the RAM 103.

The frame erasure function is a function to erase a circumference of the image read by the reading unit 109 to print the image with the erased circumference, on the sheet. OFF is set as an initial value in the frame erasure function. That is, the circumference of the image of the document is not set to be erased. When the user touches "frame erasure: OFF", the CPU 102 causes the touch panel unit 902 to display a screen 605 illustrated in FIG. 7.

Figure 7:
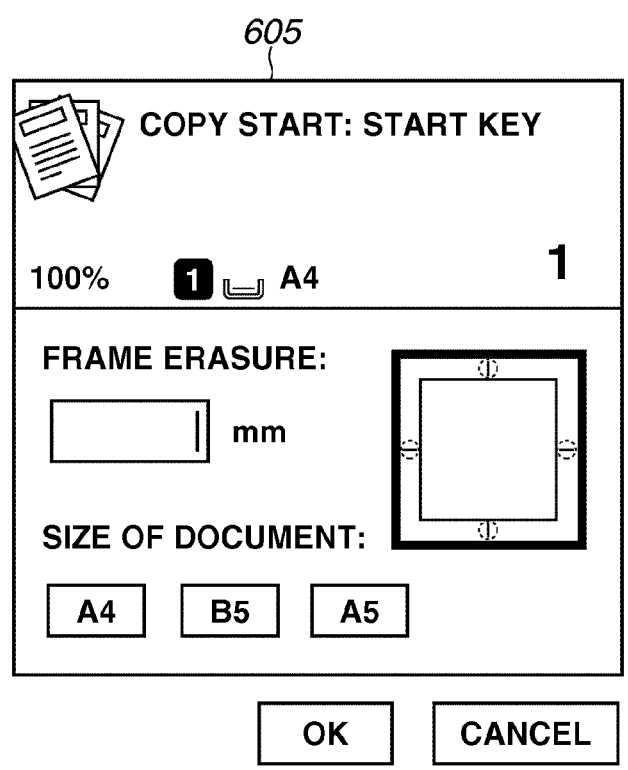
FIG. 7 illustrates an operation screen according to an exemplary embodiment of the present invention.

A width setting region for setting a width which should be erased by the frame erasure function is displayed on the screen 605 illustrated in FIG. 7.

When the user touches the width setting region, and a width which should be erased is set with the numeric keypad 906, the CPU 102 stores information set to erase the image of the set width, in the RAM 103. When the copying is started, the CPU 102 performs control to erase the circumference of the read document image of the width set by the user and print the image with the erased circumference on the sheet.

The user needs to set the size of the document in order to use the frame erasure function. This is because the CPU 102 cannot determine a region to be erased unless the size of the document as a reference for erasing is determined when the circumference of the image of the document is erased.

Consequently, an "A4" key, a "B5" key, and an "A5" key are displayed on a screen illustrated in FIG. 7. The CPU 102 stores the size pressed by the user as the size of the document in the RAM 103.

Figure 8:
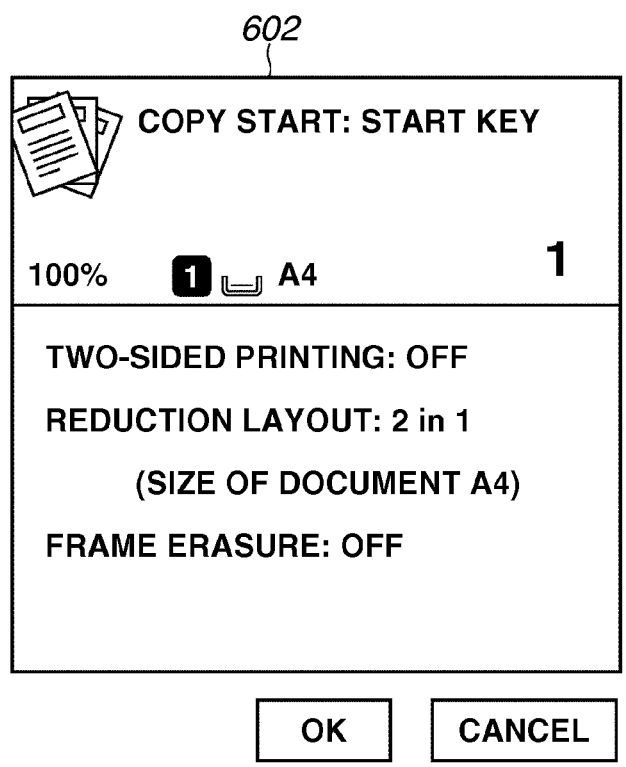
FIG. 8 illustrates an operation screen according to an exemplary embodiment of the present invention.

As described above, the user performs the setting for the copy. The CPU 102 stores a setting made by the user in the RAM 103. The CPU 102 reflects the set content on the operation screen. For example, when "2 in1" is set; "A4" is set as the document size; and an OK key is pressed on the screen 604 illustrated in FIG. 6, the CPU 102 causes the touch panel unit 902 to display a screen 602 illustrated in FIG. 8.

The screen 602 displays setting of 2in1 as the reduction layout and setting of the document size to A4. The user can confirm a present setting by viewing the screen 602.

Although the ADF 132 includes the sensor 133 for detecting the size of the document in the MFP 100 described above, the platen 131 includes no sensor for detecting the size of the document. Thereby, the cost of the MFP 100 is suppressed.

Furthermore, fundamentally, the MFP 100 reads the document using the size of the sheet set in the paper feed cassette to be used for printing, as the size of the document without causing the user to input the size of the document. Thereby, a load put on the user each time the user takes a copy can be reduced.

Figure 14A:
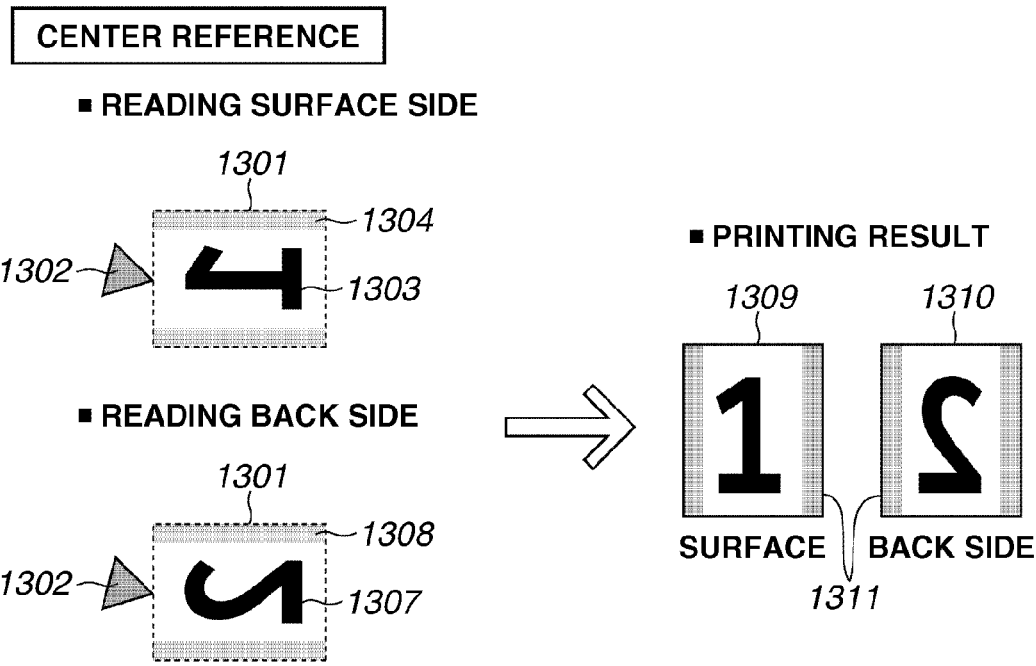
FIGS. 14A and 14B illustrate an example of a printing result in a conventional apparatus.

Conventionally, as illustrated in FIG. 14A, an apparatus having no sensor for detecting the size of a document reads the document using a center as reference. Specifically, the user matches the center line of a document 1304 with a reference point 1302 of the document illustrated in FIG. 14A. In the conventional apparatus, a reading region 1301 of a recording paper size is set by the user, centering on the reference point 1302 of the document to read an image of the reading region 1301.

Thereby, the image of the document is printed at a position 1309 of the surface of the printing sheet, and printed at a position 1310 of the back of the printing sheet. As a result, the position 1309 of the image printed on the surface of the sheet matches the position 1310 of the image printed on the back of the sheet.

However, when the document is read using the center as reference, the user must finely adjust the position of the document to match the center lines of the document.

Consequently, the MFP 100 according to the present exemplary embodiment includes no sensor for detecting the size of the document in the platen 131, and reads the document on a butting reference while suppressing the cost of the MFP 100. Thereby, the user can adjust the position of the document by a simple operation of abutting the corner of the document against the corner of the platen 131.

Figure 14B:
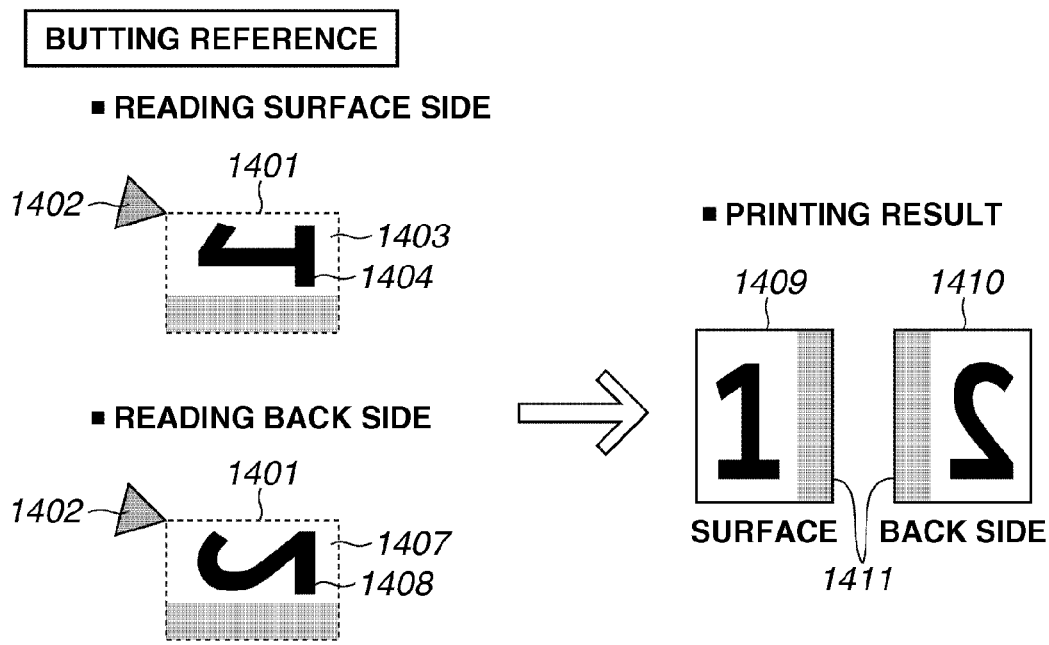

For example, the user matches the corner of the document with the corner (reference point 1402) of the platen 131 as illustrated in FIG. 14B.

Then, copying is started. However, when a reading region 1401 of the size of the printing sheet set by the user is set based on the corner of the platen 131 at this time to read the image of the reading region 1401, the following problem occurs.

The images of the document are printed at a position 1409 of the surface of the printing sheet, and at a position 1410 of the back of the printing sheet. As a result, the position 1409 of the image printed on the surface of the sheet and the position 1410 of the image printed on the back of the sheet are misaligned, which causes a reduction in quality of a printed matter.

Consequently, when the one-sided printing is performed in the MFP 100 according to the present exemplary embodiment, the size of the document is set to the size of the printing sheet, and the image of the document is read, which saves the time and labor of the user. On the other hand, when the two-sided printing is performed, the user inputs the reading size of the document, and control is performed to read the image of the document according to the reading size input by the user. Thereby, the reduction in the quality of the printed matter can be prevented. That is, while the cost is suppressed without providing the sensor for detecting the size of the document, and an operation load for the user to adjust the position of the document is reduced, the printing positions of the image on the surface of the document and the image on the back thereof can be made the same.

Figure 9:
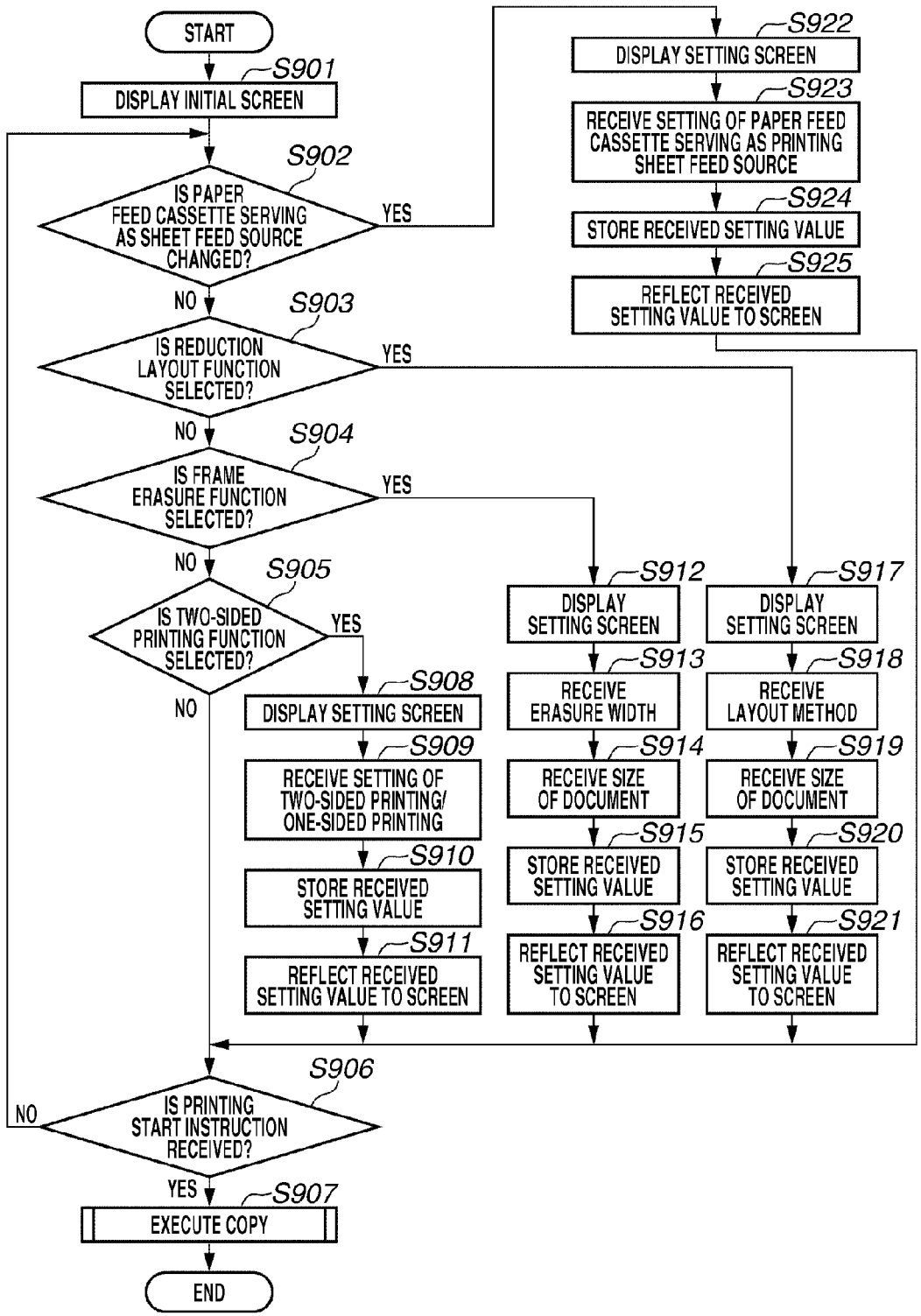
FIG. 9 is a flowchart illustrating processing according to an exemplary embodiment of the present invention.

The detail of processing of the MFP 100 will be described with reference to a flowchart of FIG. 9. The CPU 102 reads out a program stored in the ROM 104 to the RAM 103, and executes the program, to perform the processing illustrated in the flowchart of FIG. 9.

First, in step S901, the CPU 102 causes the touch panel unit 902 to display an operation screen illustrated in FIG. 4.

In step S902, the CPU 102 determines whether the display of the paper feed cassette of the operation screen is pressed. When the CPU 102 determines that the CPU 102 receives a change instruction (YES in step S902), the processing of the CPU 102 proceeds to step S922. On the other hand, when the CPU 102 determines that the CPU 102 does not receive the change instruction (NO in step S902), the processing of the CPU 102 proceeds to step S903.

In step S922, the CPU 102 causes the touch panel unit 902 to display the operation screen for changing the paper feed cassette. In step S923, the CPU 102 receives setting of the paper feed cassette used for printing from the user. In step S924, the CPU 102 stores the received setting value in the RAM 103. Specifically, the CPU 102 receives the paper feed cassette 1 or the paper feed cassette 2, and stores the received setting value in the RAM 103. The user sets the size of the sheet stored in each of the paper feed cassette 1 and the paper feed cassette 2 beforehand. The sizes of the sheet which can be set in each of the paper feed cassette 1 and the paper feed cassette 2 are A4, B5, and A5. When an A4-size sheet is set in the paper feed cassette 1, the CPU 102 recognizes that the size of the sheet used for printing is A4 when the paper feed cassette 1 is set to be used. When an A5-size sheet is set in the paper feed cassette 1, the CPU 102 recognizes that the size of the sheet used for printing is A5 when the paper feed cassette 1 is set to be used. In step S925, the CPU 102 reflects the received setting value on the operation screen, and the processing of the CPU 102 proceeds to step S906.

When the processing of the CPU 102 proceeds from step S902 to step S903, the CPU 102 determines whether an item of the reduction layout of the operation screen is touched to select the reduction layout function. When the CPU 102 determines that the reduction layout function is selected (YES in step S903), the processing of the CPU 102 proceeds to step S917. When the CPU 102 determines that the reduction layout function is not selected (NO in step S903), the processing of the CPU 102 proceeds to step S904.

In step S917, the CPU 102 causes the touch panel unit 902 to display the screen 604 illustrated in FIG. 6. In step S918, the CPU 102 receives an optional layout method from "2 in1", "4 in1", and "OFF". In step S919, the CPU 102 stores the received layout method in the RAM 103. In step S921, the CPU 102 reflects the received setting value on the operation screen, and the processing of the CPU 102 proceeds to step S906.

When the processing of the CPU 102 proceeds from step S903 to step S904, the CPU 102 determines whether an item of a frame erasure on the operation screen is touched to select the frame erasure function. When the CPU 102 determines that the frame erasure function is selected (YES in step S904), the processing of the CPU 102 proceeds to step S912. When the CPU 102 determines that the frame erasure function is not selected (NO in step S904), the processing of the CPU 102 proceeds to step S905.

In step S912, the CPU 102 causes the touch panel unit 902 to display the screen illustrated in FIG. 7. In step S913, the CPU 102 receives setting of an erasure width. In step S914, the CPU 102 receives information indicating the size of the document. In step S915, the CPU 102 stores the setting value in the RAM 103. In step S916, the CPU 102 reflects the received setting value on the operation screen, and the processing of the CPU 102 proceeds to step S905.

When the processing of the CPU 102 proceeds from step S904 to step S905, the CPU 102 determines whether the two-sided printing function of the operation screen is selected. When the CPU 102 determines that the two-sided printing function is selected (YES in step S905), the processing of the CPU 102 proceeds to step S908. When the CPU 102 determines that the two-sided printing function is not selected (NO in step S905), the processing of the CPU 102 proceeds to step S906.

In step S908, the CPU 102 causes the touch panel unit 902 to display the screen 607 illustrated in FIG. 5. In step S909, the CPU 102 receives selection either of "ON" or "OFF". In step S910, the CPU 102 stores the received setting value in the RAM 103. In step S911, the CPU 102 reflects the received setting value on the operation screen, and the processing of the CPU 102 proceeds to step S906.

In step S906, the CPU 102 determines whether the start key 905 is pressed by the user, that is, whether a printing instruction is received. When the CPU 102 determines that start key 905 is pressed (YES in step S906), the processing of the CPU 102 proceeds to step S907. When the CPU 102 determines that the start key 905 is not pressed (NO in step S906), the processing of the CPU 102 proceeds to step S902.

In step S907, the CPU 102 executes a copy based on setting of the copy stored in the RAM 103.

Figure 10:
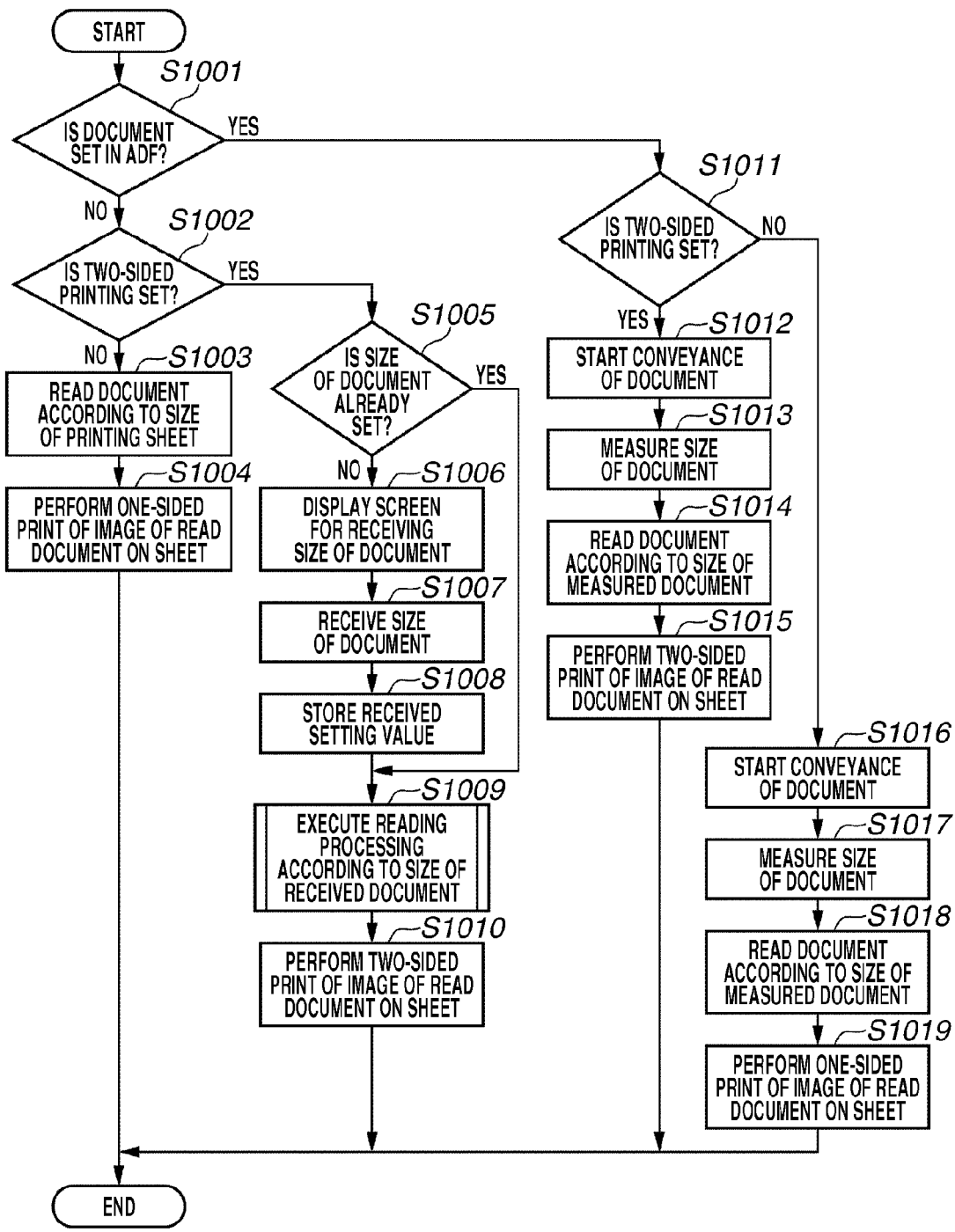
FIG. 10 is a flowchart illustrating processing according to an exemplary embodiment of the present invention.

Next, the detail of the copy in step S907 will be described with reference to FIG. 10. The CPU 102 reads out a program stored in the ROM 104 to the RAM 103 and executes the program to perform processing illustrated in a flowchart of FIG. 10.

In step S1001, the CPU 102 determines whether the document is set in the ADF 132 of the MFP 100 according to information from the document detection sensor 133. When the CPU 102 determines that the document is set in the ADF 132 (YES in step S1001), the processing of the CPU 102 proceeds to step S1022. When the CPU 102 determines that the document is not set in the ADF 132 (NO in step S1001), the processing of the CPU 102 proceeds to step S1002.

In step S1002, the CPU 102 determines whether the two-sided printing is set according to a setting value stored in the RAM 103. When the two-sided printing is set (YES in step S1002), the processing of the CPU 102 proceeds to step S1006. When the one-sided printing is set (NO in step S1002), the processing of the CPU 102 proceeds to step S1004.

In step S1003, the CPU 102 determines a size of a printing sheet stored in the RAM 103 as the size of the document. The CPU 102 causes the reading unit 109 to read an image of a region of the size of the determined document based on the corner of the platen 131, within the region of the platen 131. For example, when the size of the printing sheet is an A4 size, the CPU 102 causes the reading unit 109 to read an image of the region of the A4 size (210 mm×297 mm) based on the corner of the platen 131. The CPU 102 stores the read image in the memory unit 150.

In step S1004, the CPU 102 causes the printing unit 107 to print the image of the document read by the reading unit 109 and stored in the memory unit 150. At this time, the CPU 102 processes and prints the image according to the setting value stored in the RAM 103 if needed. For example, when 2 in1 is set, the CPU 102 controls the image processing unit 140 to reduce the image to 50% and to print the reduced image on the sheet. When the frame erasure of 3 mm is set, the CPU 102 causes the image processing unit 140 to erase an image 3 mm from the upper end of the document, 3 mm from the right end, by 3 mm from the left end, and 3 mm from the lower end, and causes the printing unit 107 to print the image. When a plurality of copies is to be printed, the CPU 102 causes the printing unit 107 to print the image of the read document by the set number of copies. Then, the CPU 102 ends the processing.

On the other hand, when the processing of the CPU 102 proceeds from step S1002 to step S1005, the document placed in the platen 131 is read and the image of the read document is printed on both the sides of the sheet. In this case, instead of the size of the printing sheet, the size of the document is specified so that the printing positions of the images printed on the back and surface of the printing sheet are not displaced from each other. The reading region is determined according to the size of the specified document. Consequently, in step S1005, the CPU 102 determines whether the size of the document is already set. For example, when the size of the document is already set in a setting process (step S915 in FIG. 9) of the reduction layout function, or when the size of the document is already set in a setting process (step S919 in FIG. 9) of the frame erasure function, the size of the document can be used. Therefore, when the size of the document is already set by the reduction layout function or the frame erasure function, the CPU 102 determines that the size of the document is already set, and the processing of the CPU 102 proceeds to step S1009. On the other hand, when both the reduction layout function and the frame erasure function are in an OFF state, and the size of the document is not yet set, the processing of the CPU 102 proceeds to step S1006.

Figure 11:
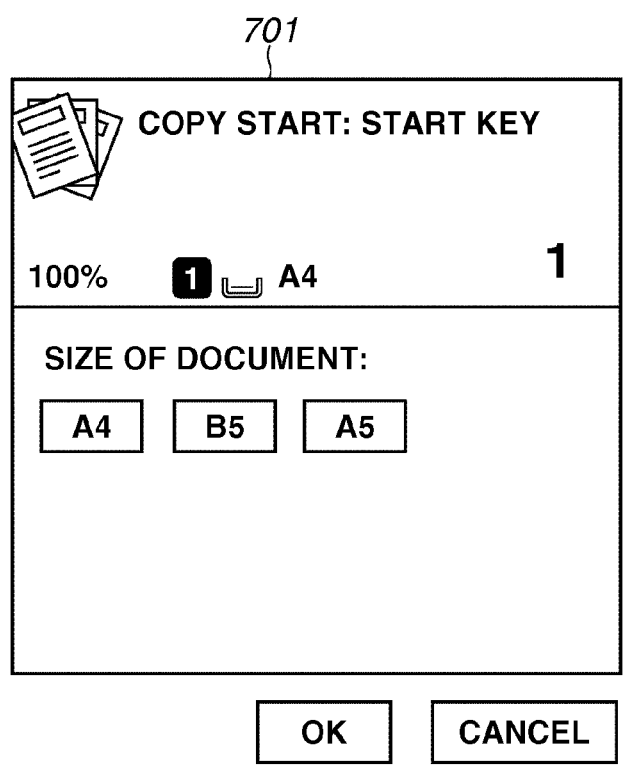
FIG. 11 illustrates an operation screen according to an exemplary embodiment of the present invention.

In step S1006, the CPU 102 causes the touch panel unit 902 to display a screen configured to receive information indicating the size of the document. FIG. 11 illustrates an example of the screen configured to receive the size of the document. The "A4" key, the "B4" key, and the "A5" key are displayed on a screen 701 illustrated in FIG. 11.

In step S1007, the CPU 102 receives the information indicating the size of the document from the user. When the user presses the "A4" key, the CPU 102 stores information representing that the size of the document is an A4 size, in the RAM 103 in step S1008. When the user presses the "B4" key, the CPU 102 stores information representing that the size of the document is a B4 size, in the RAM 103 in step S1008. When the user presses the "A5" key, the CPU 102 stores information representing that the size of the document is an A5 size, in the RAM 103 in step S1008.

In step S1009, the CPU 102 executes reading processing according to the size of the received document. The detail of the processing of step S1009 will be described with reference to FIG. 12.

Figure 12:
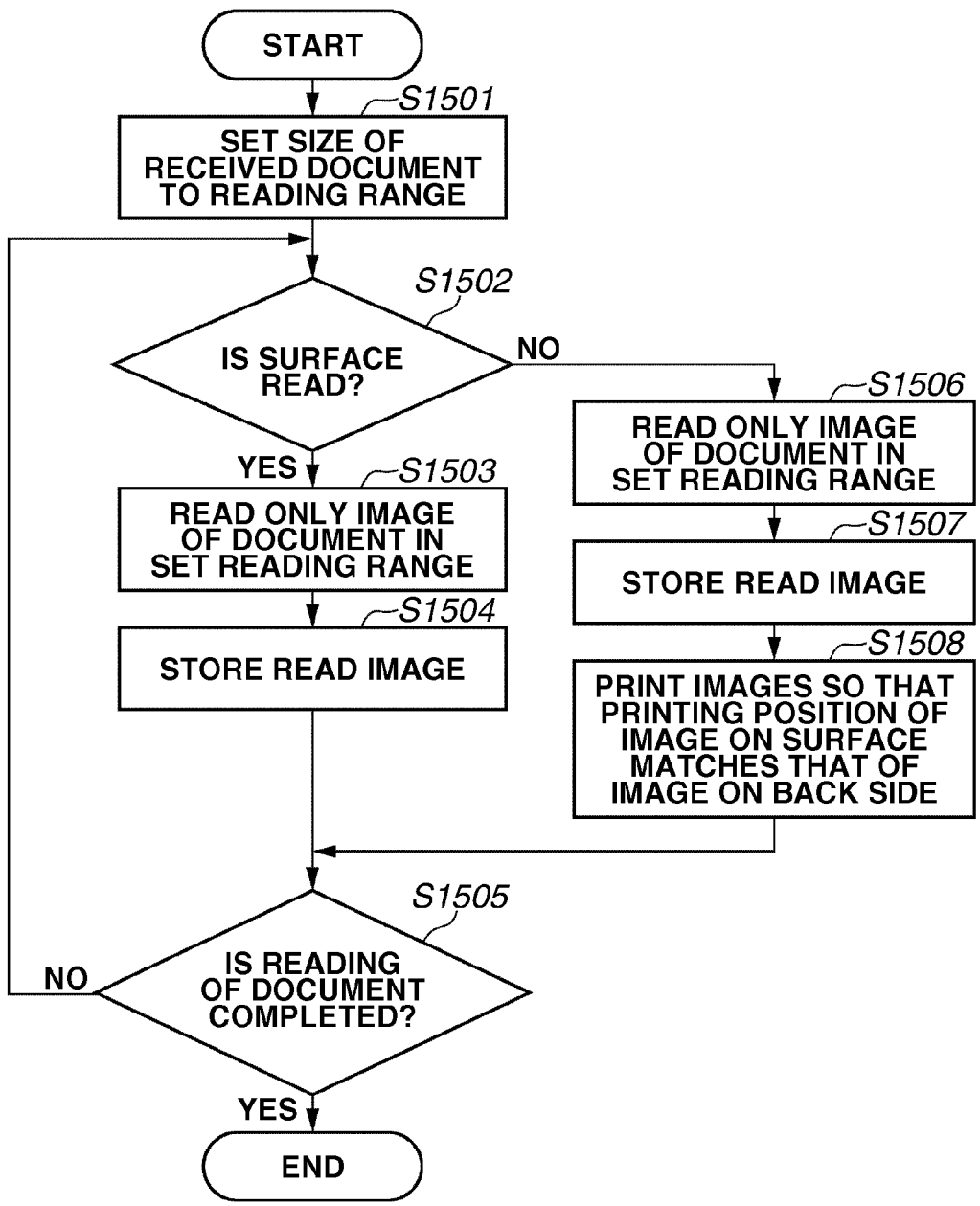
FIG. 12 is a flowchart illustrating processing according to an exemplary embodiment of the present invention.

The CPU 102 reads out a program stored in the ROM 104 to the RAM 103, and executes the program, to perform processing illustrated in a flowchart of FIG. 12.

First, in step S1501, the CPU 102 sets the size of the received document to a reading range. For example, when the size of the received document is an A4 size, the CPU 102 causes the reading unit 109 to read an image of a region of the A4 size (210 mm×297 mm).

In step S1502, the CPU 102 determines whether the surface of the document is read, or whether the back of the document is read. The CPU 102 determines that the surface of the document is read if odd-numbered reading processing is carried out after starting the reading processing (YES in step S1502), and the processing of the CPU 102 proceeds to S1503. On the other hand, the CPU 102 determines that the back of the document is read if even-numbered reading processing is carried out after starting the reading processing (NO in step S1502), and the processing of the CPU 102 proceeds to S1506.

In step S1503, the CPU 102 reads the image of the document of only the set reading range, and stores the image read in step S1504 in the memory unit 150. The processing of the CPU 102 proceeds to step S1505.

On the other hand, when the processing of the CPU 102 proceeds from step S1502 to step S1506, the CPU 102 reads the image of the document of only the set reading range, and stores the read image in the memory unit 150 in step S1507. Then, the processing of the CPU 102 proceeds to step S1508. In step S1508, the CPU 102 executes control to displace the images so that the printing position of the stored image on the back matches that of the image on the surface. By the control to displace the images, a stored position on a memory is changed so that the printing position of the image printed on the back of the sheet matches that of the image printed on the surface of the sheet. Herein, instead of changing the stored position on the memory, the CPU 102 may change a printing start timing so that the printing position of the image printed on the back of the sheet matches that of the image printed on the surface of the sheet thereof when the images are printed. The processing of the CPU 102 proceeds to step S1505.

In step S1505, the CPU 102 determines whether the reading of the document is completed. Specifically, the CPU 102 causes the touch panel unit 902 to display a message "please press a start key when the next document is read" and a "reading end" key each time one surface of the document is read. When the start key 905 is pressed, the CPU 102 causes the reading unit 109 to read the next document. When the "reading end" key is pressed, the CPU 102 finishes the reading of the document. When the CPU 102 determines that the reading of the document is finished, the processing of the CPU 102 proceeds to step S1010. When the CPU 102 determines that the next document is to be read, the processing of the CPU 102 proceeds to step S1502.

In step S1010, the CPU 102 causes the printing unit 107 to print the image of the document read by the reading unit 109 and stored in the memory unit 150. At this time, the CPU 102 performs control to print the images so that the printing position of the image on the back of the document matches that of the image on the surface. For example, when the stored position of the memory is changed so that the printing position of the image printed on the back of the sheet matches that of the image printed on the surface in step S1508, the CPU 102 prints the images on the memory as it is on the back and surface of the sheet. On the other hand, when the printing start timing is determined to be changed without changing the stored position on the memory in step S1508, the CPU 102 changes the printing start timing so that the printing position of the image printed on the back of the sheet matches that of the image printed on the surface when the images are printed on the sheet. The CPU 102 processes and prints the image according to the setting value stored in the RAM 103 if needed. For example, when 2 in1 is set, the CPU 102 controls the image processing unit 140 to reduce the image to 50% and to print the reduced image on the sheet. When the frame erasure of 3 mm is set, the CPU 102 causes the image processing unit 140 to erase an image 3 mm from the upper end of the document, 3 mm from the right end, 3 mm from the left end, and 3 mm from the lower end, and causes the printing unit 107 to print the image. When a plurality of copies are set to be printed, the CPU 102 causes the printing unit 107 to print the number of images of the read document set in the printing unit 107. Then, the CPU 102 ends the processing.

On the other hand, when the CPU 102 proceeds from step S1002 to step S1011, the document is conveyed by the ADF 132 and the image of the conveyed document is read. Because the ADF 132 has the sensor 133 in this case, the CPU 102 can recognize the size of the document when the document is conveyed and read even if the user does not perform an operation for specifying the size of the document.

In step S1011, the CPU 102 determines whether the two-sided printing is set, according to the setting value stored in the RAM 103. When the two-sided printing is set (YES in step S1011), the processing of the CPU 102 proceeds to step S1012. When the one-sided printing is set (NO in step S1011), the processing of the CPU 102 proceeds to step S1016.

In step S1012, the CPU 102 conveys the documents placed in the ADF 132 one by one. In step S1013, the CPU 102 identifies the size of the conveyed document according to a signal from the sensor 133. A method for measuring the size of the document has been described with reference to FIG. 3.

In step S1014, the CPU 102 causes the reading unit 109 to read in the region of the platen 131 the image of the size of the document stored in the RAM 103 as to the document conveyed by the ADF 132. For example, when the size of the printing sheet is an A4 size, the CPU 102 causes the reading unit 109 to read the image of the A4 size (210 mm×297 mm). The CPU 102 stores the read image in the memory unit 150.

In step S1015, the CPU 102 causes the printing unit 107 to perform two-sided printing of the image of the document read by the reading unit 109 and stored in the memory unit 150. At this time, the CPU 102 processes and prints the image according to the setting value stored in the RAM 103 if needed. For example, when 2 in1 is set, the CPU 102 controls the image processing unit 140 to reduce the image to 50% and to print the reduced image on the sheet. When the frame erasure of 3 mm is set, the CPU 102 causes the image processing unit 140 to erase an image 3 mm from the upper end of the document, 3 mm from the right end, 3 mm from the left end, and 3 mm from the lower end, and causes the printing unit 107 to print the image. When a plurality of copies are set to be printed, the CPU 102 causes the printing unit 107 to print the number of images of the read document, set in the printing unit 107. Then, the CPU 102 ends the processing.

When the processing of the CPU 102 proceeds from step S1011 to step S1016, the CPU 102 conveys the documents placed in the ADF 132 one by one in step S1016. In step S1017, the CPU 102 identifies the size of the conveyed document according to a signal from the sensor 133. A method for measuring the size of the document has been described with reference to FIG. 3.

In step S1018, the CPU 102 causes the reading unit 109 to read the image of the size of the document stored in the RAM 103 in the range of the platen 131 as to the document conveyed by the ADF 132. For example, when the size of the printing sheet is an A4 size, the CPU 102 causes the reading unit 109 to read the image of the A4 size (210 mm×297 mm). The CPU 102 stores the read image in the memory unit 150.

In step S1019, the CPU 102 causes the printing unit 107 to print the image of the document read by the reading unit 109 and stored in the memory unit 150. At this time, the CPU 102 processes and prints the image according to the setting value stored in the RAM 103 if needed. For example, when 2 in1 is set, the CPU 102 controls the image processing unit 140 to reduce the image to 50% and to print the reduced image on the sheet. When the frame erasure of 3 mm is set, the CPU 102 causes the image processing unit 140 to erase an image 3 mm from the upper end of the document, 3 mm from the right end, 3 mm from the left end, and 3 mm from the lower end, and causes the printing unit 107 to print the image. When a plurality of copies are set to be printed, the CPU 102 causes the printing unit 107 to print the number of the images of the read document set in the printing unit 107. Then, the CPU 102 ends the processing.

Figure 13:
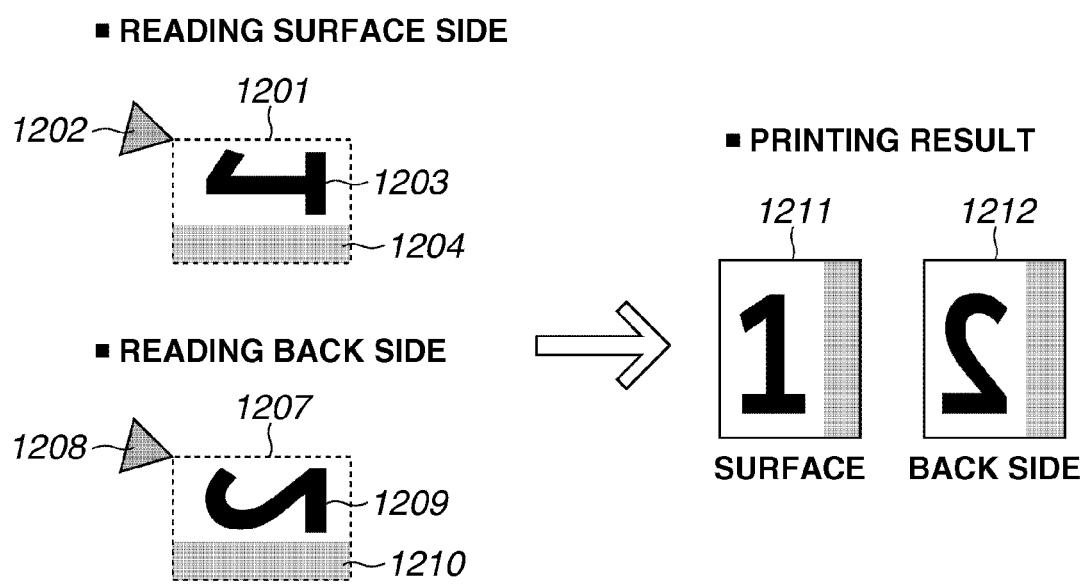
FIG. 13 illustrates an example of a printing result according to an exemplary embodiment of the present invention.

The control is performed as described above, and the user sets the size of the document only when the size of the document is required in the apparatus having no sensor for detecting the size of the document placed in the platen 131. Thereby, the user's operation load can be reduced. Specifically, the user sets the size of the document only when the two-sided printing of the image of the document is to be performed. Thereby, as illustrated in FIG. 13, an image 1203 of a document 1201 can be read without reading a region 1204 having no document even if the document 1201 is placed such that the document 1201 abuts on a reference point 1202 of the corner of the platen 131. Similarly, also with respect to the back side, an image 1209 of a document 1207 can be read without reading a region 1210 having no document even if the document 1207 is placed such that the document 1207 abuts on the reference point 1202 of the corner of the platen 131. Thus, the printing can be executed so that the printing position of an image 1211 on the surface of the printing sheet and the printing position of an image 1212 on the back thereof are not displaced from each other.

(Other Exemplary Embodiment)

In the above-mentioned exemplary embodiment, the region having no document is not read when the user sets the size of the document. However, the present invention is not limited thereto. For example, the following method may be performed. After the CPU 102 reads the region having no document once, the CPU 102 then erases the image of the region having no document according to the size of the document, and does not print the image of the region on the printing sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-165943 filed Jul. 26, 2012, which is hereby incorporated by reference herein in its entirety.

What is claimed is:

1. An image forming apparatus capable of performing one side printing and both side printing, comprising:
   a scanner which performs a reading process on a document having been placed on a platen to obtain image data;
   a user interface which receives a size of the document from a user;
   a control unit configured to control the scanner to perform the reading process on the document; and
   a printing unit configured to print the image data on a sheet,
   wherein the control unit controls the scanner to perform the reading process based on a size of the sheet and obtains image data, and the printing unit performs one side printing based on the obtained image data
   wherein in a case where the both side printing is set and a document having been placed on the platen is to be read, the control unit controls, on the condition that a size of the document is received via the user interface, the scanner to perform the reading process, based on the received size, on the document having been placed on the platen, and obtains image data, and the printing unit performs both side printing based on the obtained image data.

2. The image forming apparatus according to claim 1, wherein the scanner performs the reading process on the document based on a size of the sheet, and the printing unit performs one side printing on image data read by the reading process to print the image data on the sheet.

3. The image forming apparatus according to claim 1, wherein the user interface is configured to display a plurality of sizes of a document and to receive a size selected by a user from the plurality of sizes of a document.

4. The image forming apparatus according to claim 3, wherein a screen for prompting a user to select a size from the plurality of sizes of a document is displayed after a print start instruction is received.

5. The image forming apparatus according to claim 4, wherein the screen for prompting a user to select a size from the plurality of sizes of a document is not displayed when the size of the document has been input before the print start instruction is received.

6. The image forming apparatus according to claim 5, wherein in a case where the document is to be conveyed by a conveying unit, the screen for prompting a user to select a size from the plurality of sizes of a document is not displayed even when two-sided printing is set.

7. The image forming apparatus according to claim 1, further comprising a displacing unit configured to displace the image read by performing the reading process so that a printing position of an image to be printed on the back of a sheet matches that of the read image to be printed on the surface of the sheet.

8. The image forming apparatus according to claim 1, wherein in the reading process, the document is read with reference to a corner of the platen.

9. The image forming apparatus according to claim 1, wherein in a case where both side printing is set, the scanner performs the reading process on the document within a reading region based on the received size.

10. The image forming apparatus according to claim 1, wherein in a case where both side printing is set, the scanner performs the reading process on the document and obtains the image data having the received size.

11. A method for controlling an image forming apparatus capable of performing one side printing and both side printing, comprising:
    performing a reading process on a document having been placed on a platen to obtain image data;
    performing the reading process on the document; and
    printing the image data on the sheet,
    wherein the reading process is performed based on a size of the sheet, and the one side printing is performed based on the obtained image data
    wherein in a case where both printing is set and a document having been placed on a platen is to be read, on the condition that a size of the document is received by the user interface, performing the reading process based on the received size on the document having been placed on the platen, and obtain image data, and performing both side printing based on the obtained image data.

12. The method according to claim 11, further comprising performing reading process on the document based on a size of the sheet, and one side printing on image data read by the reading process to print the image data on the sheet.

13. The method according to claim 11, wherein the user interface is configured to display a plurality of sizes of a document and to receive a size selected by a user from the plurality of sizes of a document.

14. The method according to claim 13, wherein a screen for prompting a user to select a size from the plurality of sizes of a document is displayed after a print start instruction is received.

15. The method according to claim 14, wherein the screen for prompting a user to select a size from the plurality of sizes of a document is not displayed when the size of the document has been input before the print start instruction is received.

16. The method according to claim 15, wherein in a case where the document is to be conveyed by a conveying unit, the screen for prompting a user to select a size from the plurality of sizes of a document is not displayed even when both side printing is set.

17. The method according to claim 11, further comprising displacing the image data obtained by performing the reading process so that a printing position of an image to be printed on the back of a sheet matches that of the read image data to be printed on the surface of the sheet.

18. The method according to claim 11, wherein in the reading process, the document is read with reference to a corner of the platen.

19. The method according to claim 11, wherein in a case where both side printing is set, the scanner performs the reading process on the document within a reading region based on the received size.

20. The method according to claim 11, wherein in a case where both side printing is set, performing the reading process on the document and obtains the image data having the received size.

* * * * *